US012760207B2

(12) United States Patent
Galica

(10) Patent No.: US 12,760,207 B2
(45) Date of Patent: *Oct. 13, 2026

(54) THERMOPLASTIC POLYMER STRUCTURE AND METHODS FOR MAKING THE SAME

(71) Applicant: DelStar Technologies, Inc., Alpharetta, GA (US)

(72) Inventor: James Galica, Westhampton, MA (US)

(73) Assignee: DelStar Technologies, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/743,375

(22) Filed: Jun. 14, 2024

(65) Prior Publication Data

US 2024/0368442 A1 Nov. 7, 2024

Related U.S. Application Data

(63) Continuation of application No. 17/555,964, filed on Dec. 20, 2021, now Pat. No. 12,049,573.

(Continued)

(51) Int. Cl.

*C09J 151/08* (2006.01)
*B32B 17/10* (2006.01)
*C08F 283/00* (2006.01)

(52) U.S. Cl.

CPC ....... *C09J 151/08* (2013.01); *B32B 17/10036* (2013.01); *B32B 17/10697* (2013.01);

(Continued)

(58) Field of Classification Search

CPC ................ C09J 151/08; C08F 283/006; B32B 17/1077; B32B 17/10899; B32B 17/10697; B32B 17/10036; B32B 2419/06

(Continued)

(56) References Cited

U.S. PATENT DOCUMENTS 4,912,148 A 3/1990 Kim et al.
5,716,574 A 2/1998 Kawasaki (Continued)

FOREIGN PATENT DOCUMENTS

CN 1703448 A 11/2005
CN 104844982 A * 8/2015 ............ H01B 3/443

(Continued)

OTHER PUBLICATIONS

Translation of EP-0755973-A1 (Year: 1997).*

(Continued)

*Primary Examiner* — Tri V Nguyen
(74) *Attorney, Agent, or Firm* — Farber LLC

(57) ABSTRACT

A composition and a method for manufacturing the composition are provided that includes a thermoplastic polyurethane (TPU) and a second component in an amount in the range of about 3% to about 60% by weight of the composition. The second component includes at least one reactive diluent, monomer, or oligomer (RDMO). The RDMO and/or the TPU may be cross-linked to form a semi-interpenetrating polymer network or an interpenetrating polymer network. The RDMO provides improved physical properties, such as rigidity, durability and strength, to the TPU. The polymer network may be bonded to other layers for certain applications, such as windows and flooring, to improve flexibility and strength, inhibit shattering and/or resist scratching and staining.

28 Claims, 1 Drawing Sheet

Related U.S. Application Data

(60) Provisional application No. 63/128,632, filed on Dec. 21, 2020.

(52) U.S. Cl.
CPC .... *B32B 17/1077* (2013.01); *B32B 17/10899* (2013.01); *C08F 283/006* (2013.01); *B32B 2419/06* (2013.01)

(58) Field of Classification Search
USPC ........................................................ 428/425.6
See application file for complete search history.

(56) References Cited

U.S. PATENT DOCUMENTS

| | | | | |
|---|---|---|---|---|
| 6,469,071 | B1 | 10/2002 | Fan et al. | |
| 7,728,049 | B2 | 6/2010 | Zamore | |
| 8,758,898 | B2 | 6/2014 | Friedman et al. | |
| 9,822,253 | B2 | 11/2017 | Lindsay et al. | |
| 10,538,031 | B2 | 1/2020 | Chen et al. | |
| 10,626,310 | B2 * | 4/2020 | López Maeso | C07F 7/30 |
| 2005/0147778 | A1 * | 7/2005 | Tai | B32B 27/30 428/36.9 |
| 2006/0099338 | A1 | 5/2006 | Boelz et al. | |
| 2009/0087669 | A1 * | 4/2009 | Hayes | B32B 17/10761 428/432 |
| 2009/0087869 | A1 | 4/2009 | Fujimoto et al. | |
| 2013/0025774 | A1 * | 1/2013 | Neill | B32B 37/153 156/244.11 |
| 2013/0276973 | A1 | 10/2013 | Rule et al. | |
| 2014/0094571 | A1 | 4/2014 | Boudou et al. | |
| 2016/0135955 | A1 * | 5/2016 | Henderson | A61L 27/16 623/23.61 |
| 2016/0347026 | A1 * | 12/2016 | Kugel | B32B 27/00 |
| 2018/0022849 | A1 | 1/2018 | Kakeya et al. | |
| 2018/0118915 | A1 | 5/2018 | Hatakeyama et al. | |
| 2019/0048105 | A1 | 2/2019 | Giannini et al. | |
| 2019/0136035 | A1 | 5/2019 | Nomoto et al. | |
| 2019/0152200 | A1 * | 5/2019 | Collette | C08L 51/08 |
| 2020/0276795 | A1 * | 9/2020 | Collette | B32B 27/08 |
| 2020/0291168 | A1 | 9/2020 | Pellacani et al. | |
| 2024/0284763 | A1 * | 8/2024 | Long | H10K 59/87 |

FOREIGN PATENT DOCUMENTS

| | | | | |
|---|---|---|---|---|
| CN | 109942781 | A | 6/2019 | |
| EP | 0755973 | A1 * | 1/1997 | C08L 59/00 |
| EP | 1433829 | A1 | 6/2004 | |
| JP | 06287401 | A | 10/1994 | |
| JP | 2001527222 | A | 12/2001 | |
| JP | 2016512273 | A | 4/2016 | |
| KR | 20100134293 | A | 12/2010 | |
| WO | 2011152404 | A1 | 12/2011 | |
| WO | 2013084967 | A1 | 6/2013 | |
| WO | 2017082009 | A1 | 5/2017 | |
| WO | 2019097031 | A1 | 5/2019 | |
| WO | 2020144260 | A1 | 7/2020 | |

OTHER PUBLICATIONS

Translation of CN-104844982-A (Year: 2015).*
Clemitson, Ian R., Castable PolyUrethane Elastomers; file:///Users/lidia/Downloads/CastablePolyurethaneElastomers.pdf.
Fink_ Book Chapter topics: Poly(urethane)s in Reactive Polymers Fundamentals and Applications (Second Edition), 2013.
Abliz et al., 2013. Curing Methods of Advanced Polymer Composites—A Review a. Only abstract.
Katagiri Science Direct Chapters a. https://www.sciencedirect.com/topics/materials-science/organic-inorganic-hybrid-material.
Chua et al., 2019 Chapter published on Springer: https://link.springer.com/chapter/10.1007/978-3-030-02327-0_10 Only abstract.
Suzuki et al., 1982, Only abstract. https://onlinelibrary.wiley.com/doi/abs/10.1002/jbm.820160308.
Bretterbauer et al., 2013. UV-curable coatings of highly crosslinked trimethylmelamine based acrylates and methacrylates. Only abstract.

* cited by examiner

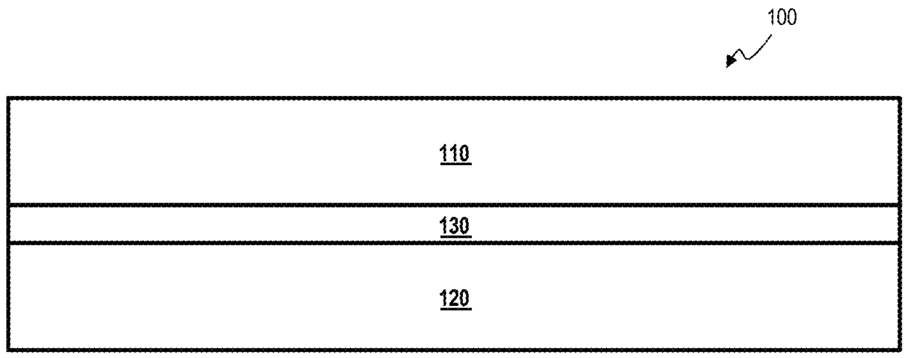
100
110
130
120

THERMOPLASTIC POLYMER STRUCTURE AND METHODS FOR MAKING THE SAME

CROSS-REFERENCE TO RELATED APPLICATIONS

This application is a Continuation Application of U.S. Nonprovisional application Ser. No. 17/555,964 filed on Dec. 20, 2021 which claims benefit of U.S. Provisional Application No. 63/128,632 filed on Dec. 21, 2020, the complete disclosures of which are incorporated herein by reference in their entirety for all purposes.

BACKGROUND

Thermoplastic polymers, such as thermoplastic polyurethanes (TPU), are used as materials in a wide variety of products, such as windows and flooring, in particular for their high tensile and tear strength, high flexibility at low temperatures, extremely good abrasion and scratch resistance. Frequently provided as layers, the particular compositions of TPU layers can be modified for their specific applications. For example, polymer films used in automobile glass can be modified to prevent shattering. Additionally, polymer films used in bullet-resistant glass can be tailored to improve flexibility and strength. Further, polymer films used in flooring can be tailored to resist scratching and staining.

While these TPU films have shown great promise, it is desirable to improve certain physical properties of TPU films, such as rigidity, toughness, durability and/or strength. It is particularly desirable to improve these properties without substantially altering the other characteristics of the polymer structure.

SUMMARY

A thermoplastic polymer (TPU) composition or structure is provided. The thermoplastic polymer structure may be bonded to other layers for certain applications, such as windows, roofing, flooring, walls, facades, and the like, to improve flexibility, strength, rigidity, toughness and/or durability, inhibit shattering, increase abrasion and wear resistance and/or resist scratching and staining.

In one aspect, a composition comprises a TPU and a second component in an amount in the range of about 3% to about 60% by weight of the composition. The second component includes at least one reactive diluent, monomer, or oligomer (RDMO). The second component provides improved physical properties, such as rigidity and strength, to the TPU.

The second component may be cross-linked to form a semi-interpenetrating polymer network. The second component and the TPU may both be cross-linked to form an interpenetrating polymer network.

The second component may include two or more reactive diluents, monomers, or oligomers. The second component(s) may be selected from the group consisting of a monofunctional acrylate, difunctional acrylate, trifunctional acrylate, monofunctional methacrylate, difunctional methacrylate, trifunctional methacrylate, an acrylate or methacrylate having four to six functional groups, pentaerythrityl triacrylate, polyhedral oligomeric silsequioxane, and tri-allyl isocyanurate.

In one embodiment, the second component is about 20% by weight of the composition. The second component may comprise a monofunctional acrylate, difunctional acrylate, trifunctional acrylate, monofunctional methacrylate, difunctional methacrylate, trifunctional methacrylate, an acrylate or methacrylate having four to six functional groups, pentaerythrityl triacrylate, and tri-allyl isocyanurate.

In one embodiment, the second component may be selected from the group consisting of 20% monofunctional acrylate, 20% difunctional acrylate, and 20% trifunctional acrylate. In one embodiment, the second component may be a methacrylate having up to six functional groups. In one exemplary embodiment, the second component may comprise comprises 20% difunctional methacrylate. In another exemplary embodiment, the trifunctional acrylate may be a pentaerythrityl triacrylate (PETA).

In another embodiment, the second component is about 5% by weight of the composition. The second component may comprise an inorganic silsequioxane, such as polyhedral oligomeric silsequioxane, attached to other groups. The other groups may include organic methacrylate groups, organic isoctyl groups, organic vinyl groups, and/or active silanol functional groups.

In one exemplary embodiment, the second component may comprise tri-allyl isocyanurate. For example, the second component may comprise 20% tri-allyl isocyanurate.

The thermoplastic polyurethane (TPU) may be an aliphatic polyurethane, such as for example, a polyether aliphatic polyurethane or a polyester aliphatic polyurethane. In another embodiment, the TPU may be a non-aliphatic polyurethane, such as for example, a polyether non-aliphatic polyurethane or a polyester non-aliphatic polyurethane.

The composition may include a curing agent. The curing agent may be selected from a group consisting of UV-activated photoinitiators, peroxides, and azo compounds.

In one exemplary embodiment, the curing agent may be a peroxide, and may be in an amount that is about 1.5% by weight. The peroxide may be 2,5-dimethyl-2,5-di(t-butylperoxy)-3-hexyne having a one-hour half-life at 151.8° C., or di(t-butyl) peroxide having a one-hour half-life at 149.1° C., or 2,5-dimethyl-2,5-di(t-butylperoxy) hexane having a one-hour half-life at 140.3° C. In other embodiments, the peroxide may be selected from the group consisting of 2,3-Dimethyl-2,3-diphenylbutane, tert-Butyl hydroperoxide, tert-Amyl hydroperoxide, Cumyl hydroperoxide, 1,1,3,3-Tetramethylbutyl hydroperoxide, Isopropylcumyl hydroperoxide, Isopropylcumyl hydroperoxide, 2,5-Dimethyl-2,5-di (tert-butylperoxy) hexyne-3, and 3,6,9-Triethyl-3,6,9-trimethyl-1,4,7-triperoxonane. It is understood that alternative curing agents to peroxides may be used including UV-activated photoinitiators or compounds with free-radical-generating functional groups.

In another aspect, a composition comprises a TPU and a second component. The second component includes at least one reactive diluent, monomer, or oligomer (RDMO) in an amount that improves the rigidity (i.e., a modulus of rigidity or a modulus of elasticity) of the TPU. For example, in certain embodiments, the composition has a Young's Modulus of greater than about 10, preferably at least 18.34, for a load duration of one second at 30° C., and greater than about 3.83, preferably at least 6.58, for a load duration of about 2 months at 30° C. In yet another example, the composition has a Young's Modulus greater than about 3.69 for a load duration of about 1 second at 60° C. and greater than about 2.39, preferably at least 2.86 for a load duration of one hour at 60° C.

In another aspect, a composition comprises a TPU and a second component that includes at least one reactive diluent, monomer, or oligomer (RDMO). The second component has a glass transition temperature ($T_g$) of at least about-60 degrees Celsius. In some other embodiments, the second component can have a $T_g$ of greater than about 60 degrees Celsius, preferably greater than about 110 degrees Celsius.

In another aspect, a laminate structure is provided. The laminate structure may comprise a composition of thermoplastic polyurethane (TPU) and a second component, the second component including at least one reactive diluent, monomer, or oligomer (RDMO) in an amount in the range of about 3% to about 60% by weight of the composition, and at least one other layer.

In one embodiment, the composition is positioned between two other layers. In certain aspects, the two other layers may comprise glass layers, wherein the composition forms an interlayer between the two layers of glass. There may be a release liner separating the composition interlayer and the glass layers so that the final configuration is the following: Glass/Release Liner/modified TPU/Release Liner/Glass.

In another embodiment, the composition is bonded to a single layer to form, for example, a roofing, flooring, wall or facade structure.

The second component may include two or more reactive diluents, monomers, or oligomers. The second component(s) may be selected from the group consisting of a monofunctional acrylate, difunctional acrylate, trifunctional acrylate, monofunctional methacrylate, difunctional methacrylate, trifunctional methacrylate, an acrylate or methacrylate having four to six functional groups, pentaerythrityl triacrylate, polyhedral oligomeric silsequioxane, and tri-allyl isocyanurate.

The second component may be cross-linked to form a semi-interpenetrating polymer network. The second component and the TPU may both be cross-linked to form an interpenetrating polymer network.

In another aspect, a method of making a composition comprises mixing thermoplastic polyurethane (TPU) with a second component, the second component including at least one reactive diluent, monomer, or oligomer (RDMO) in an amount in the range of about 3% to about 60% by weight of the composition, and mixing a curing agent with the TPU and the second component.

This mixing may include the steps of melting the thermoplastic polyurethane, adding to it the second component, and mixing the thermoplastic polyurethane and the second component. In some embodiments, the mixing may be conducted for at least five minutes using a mixer set to a temperature of up to about 120° C. In another embodiment, the method may further comprise cooling the thermoplastic polyurethane and the second component in a molten state.

A curing agent is added to the modified TPU. In some embodiments, the addition of the curing agent is done simultaneously to the addition of the second component to the thermoplastic polyurethane. In other embodiments, the curing agent is added after the mixing of the TPU with the second component. The method may further comprise mixing the TPU, second component, and curing agent to form a precursor to the interpenetrating or semi-interpenetrating polymer network. The curing agent may be added by gravimetric addition or blending. The method may further comprise curing the precursor to form an interpenetrating or semi-interpenetrating polymer network. The methods may include mixing steps which have a duration of at least five minutes and are conducted using a mixer.

In one embodiment, an extrudate may be formed from the thermoplastic polyurethane, second component and curing agent by using an extruder and maintaining a temperature of up to about 120° C. to prevent crosslinking of the curing agent. In other embodiments, the second component may exhibit greater thermal stability, and thus the temperature may be maintained at up to about 140° C. while still preventing crosslinking. The method may comprise extruding the extrudate, flattening the extrudate, and cooling the flattened extrudate. The thermoplastic polyurethane, second component, and curing agent may be simultaneously laminated and cured.

In one embodiment, lamination can be achieved by vacuum laminating with a vacuum laminator having a top and a bottom chamber for a 60-minute cycle at 160° C. Alternative vacuum laminating steps which are known to those skilled in the art may be used. In some embodiments, the vacuum laminating step may include ten minutes of evacuation of both top and bottom chambers, then the balance of time pressurizing the top chamber using a partial atmosphere of pressure to a full atmosphere of pressure while maintaining the laminate structure under vacuum in the bottom chamber, resulting in the pressing and curing of the modified TPU within the laminate.

In one embodiment, evacuation, followed by pressing and curing, may occur while maintaining a full vacuum on the top and bottom chambers of the laminator for the first ten minutes. The pressing and curing may occur while maintaining a partial to full atmospheric pressure on the top chamber of the vacuum laminator.

BRIEF DESCRIPTION OF THE DRAWINGS

The FIGURE, which is incorporated in and constitutes a part of this specification, illustrates an exemplary embodiment and together with the detailed description, serves to explain the principles of the description.

FIG. 1 shows a cross-sectional view illustrating an exemplary embodiment of a laminate structure having a polymer structure between first and second layers.

DETAILED DESCRIPTION

A thermoplastic polymer structure is provided that includes a thermoplastic polyurethane (TPU) and a second component. The second component includes at least one reactive diluent, monomer, or oligomer (RDMO) in an amount in the range of about 3% to about 60% by weight of the composition. The second component alters a TPU interlayer's physical properties and strengths through modification of the TPU by addition of reactive diluents/monomers/oligomers (RDMO) to the TPU resin matrix.

The thermoplastic polymer structure may be bonded to other layers for certain applications, such as windows, roofing, flooring, walls, facades and the like, to improve flexibility, durability, rigidity and/or strength, inhibit shattering and/or resist scratching and staining. For example, a glass structure with the thermoplastic polymer layer may be used vehicles, aircrafts, watercraft, buildings, military vessels, including submarines, for protective purposes, in police stations, prisons, jails, or equipment for a nation's border, in a bank, embassy, or government building, for showcasing artwork, including artwork in museums, for showcasing merchandise, for use in a zoo, for use in a fire engine, or for use in protective helmets. In another example, the thermoplastic structure may be bonded with another layer to form a roofing, flooring, wall or façade structure that has improved abrasion and wear resistance.

In certain aspects, the structural polymer network may be an interpenetrating polymer network (IPN) or a semi-interpenetrating polymer network (semi-IPN). Interpenetrating polymer networks (IPNs) are combinations of two or more polymers which have been polymerized or crosslinked in the presence of each other, but not covalently bonded to each other (or that bonding is negligible between the two or more polymers). A semi-IPN is a polymer comprising one or more networks and one or more linear or branched polymers characterized by the penetration on a molecular scale of at least one of the networks by at least some of the macromolecules. Some embodiments of the TPU interlayer disclosed herein are semi-IPNs due to crosslinking of the RDMO by free radicals of peroxide that form entangled chains with the TPU in a dual network. For example, formation of a crosslinked TPU can involve chemical bonds formed by crosslinking a polymer and the TPU having terminal functional radically-polymerizable groups on both ends of the TPU. These IPNs can provide the TPU with advantageous attributes, including improved transparency and hardness in comparison to a TPU alone. In some embodiments, the attributes of the TPU are tailored through selection of the RDMO. In embodiments, rigidity and hardness of a TPU film are improved by increasing complex chemical structures in the TPU, such as for example, by adding RDMOs having a high glass transition temperature (Tg) and a low molecular weight.

The properties of the structural TPU Interlayer can be tailored through selection of the RDMO. The attributes that impact physical strengths include chemical structure, degree of functionality, molecular weight and $T_g$ (glass transition temperature). Applicants' have discovered that complex chemical structures and increasing functionality positively impact the structural TPU interlayer's rigidity and strength. Similarly, the higher the glass transition temperature of the RDMO, the more rigid the resulting structural TPU interlayer. The lower the molecular weight of the RDMO, the higher the strength and rigidity.

FIG. 1 shows a cross-sectional view illustrating an example of a laminate structure 100 having a polymer film layer. In some embodiments, the modified TPU may be included in a laminate structure comprising the modified TPU and at least one other layer. In one embodiment, the composition is between two other layers. In one embodiment, the two other layers comprise glass layers.

In some embodiments, the laminate structure 100 comprises a first layer 110, a second layer 120, and a polymer interlayer 130 between the first layer 110 and the second layer 120. In some embodiments, the first layer 110 and the second layer 120 can be glass. For example, the first layer 110 and the second 120 can be sheets of automotive glass, architectural glass or other suitable types of glass.

In some embodiments, the polymer interlayer 130 is a substantially planar film having an upper surface bonded to the first layer 110 and a lower surface bonded to the second layer 120. In some embodiments, the polymer interlayer 130 can have a thickness up to about 3 millimeters. In some embodiments, the thickness of the polymer interlayer 130 may be in the range of about 50 micrometers to about 1 millimeter. In other embodiments, the thickness of the polymer interlayer 130 may be in the range of about 50 micrometers to about 5 millimeters. It is understood that the laminate structure can include additional layers and that the layers can have different thicknesses, lengths, and widths. In other embodiments, different types of moldings, such as for example, injection molding, may be used to mold the composition into different shapes.

In some embodiments, the polymer interlayer 130 is a TPU. TPU polymers can be formed by reacting polyols with polyisocyanates. The polyols can include polyester polyols, polyether polyols, polycarbonate polyols, and polycaprolactone polyols. In some embodiments, the polyol can be polycaprolactone-based. In another embodiment, the TPU can be an aliphatic, polycaprolactone-based thermoplastic polyurethane. In some embodiments, the polymer interlayer 130 can include a semi-IPN formed from an aliphatic TPU using one or more RDMO additives crosslinked by a free-radical of peroxide. For example, the aliphatic TPU can be ELASTOLLAN® provided by BASF SE of Ludwigshafen, Germany. In some embodiments, suitable RDMOs include: acrylate, methacrylate, polyhedral oligomeric silsesquioxane (POSS), and triallyl isocyanurate (TAIC). Acrylate and methacrylate monomers or oligomers can be monofunctional or polyfunctional. In some embodiments, the acrylate or methacrylate is solely polyfunctional. In some embodiments the polyfunctional acrylate or methacrylate has up to six functionalities. In some embodiments the methacrylate or acrylate is difunctional methacrylate, difunctional acrylate, or trifunctional acrylate pentaerythrityl triacrylate (PETA). In some embodiments, the POSS is inorganic silsequioxane at the core and organic vinyl groups attached, inorganic silsequioxane at the core and organic methacrylate groups attached, inorganic silsequioxane with organic isooctyl groups and three active silanol functionalities attached. In some embodiments the TAIC is a trifunctional TAIC.

In some embodiments, the polymer interlayer 130 can have a Young's Modulus of at least 25 MPa for a load duration of one second at 30° C. using ASTM D4065 standard testing methods. In some embodiments, the polymer interlayer 130 can have a Young's Modulus of at least 6 MPa for a load duration of one month at 30° C. In some embodiments, the polymer interlayer can have a Young's Modulus of at least 4 MPa for a load duration of one second at 60° C. In some embodiments, for a 3 s load duration test performed at 30° C., the Young's Modulus may range from about 1.5 megapascals (MPa) to about 23 MPa. In some embodiments, the polymer interlayer 130 can have a Young's Modulus ranging from about 5 MPa to about 40 MPa. In some embodiments, the polymer interlayer 130 can have a Young's Modulus ranging from about 15 MPa to about 35 MPa.

Table 2 shows Young's Modulus values for some embodiments of the composition for different time durations at a 30° C. for some modified TPUs. Table 3 shows Young's Modulus values for some embodiments of the composition at a 60° C. load at different time durations for some TPUs.

According to another exemplary embodiment, a method of making the above composition is provided. The method may comprise mixing the thermoplastic polyurethane, second component, and free radical curing agent together by, for example, twin-screw extrusion. Of course, it is understood that other mixing techniques may be employed. For example, single screw extrusion may also be used. The addition of the second component and curing agent can be performed using conventional melt-compounding methods, such as for example, using a Farrel Continuous Mixer (FCM™), C. W. Brabender roller bladed mixers, or by twin screw extrusion.

In some embodiments, when small-scale or lab-scale modification of the TPU is desired, the method of modifying the TPU may include the steps of melting the TPU at a temperature of up to about 120° C., dosing the TPU with the RDMO component such that each dose becomes incorporated before the addition of the next dose, and mixing the TPU and the second component for at least five minutes using a mixer. In some embodiments, the curing agent may be added using the same method after or simultaneously to the addition of the RDMO. In other embodiments, such as for example, when a large commercial-scale TPU-modification is desired, other mixing methods may be used, including twin screw extrusion. In some embodiments, the method may also include stabilizing the RDMO for extrusion using scorch retardants if thermal stability becomes an issue, as evidenced by crosslinking in the extruder.

In some embodiments, the RDMO can be in the range of about 3% to about 60% by weight of the composition. In some embodiments the RDMO can be one or more of: 20% monofunctional acrylate, 5% inorganic silsequioxane at the core and organic vinyl groups attached, 5% inorganic silsequioxane at the core and organic methacrylate groups attached, 20% difunctional, 20% difunctional acrylate, 20% trifunctional acrylate PETA, 20% trifunctional TAIC, and blends thereof. In some embodiments, the RDMO can have a $T_g$ of about-60 degrees Celsius. In some other embodiments, the RDMO can have a $T_g$ of greater than about 60 degrees Celsius. In some other embodiments, the RDMO can have a $T_g$ of greater than about 85 degrees Celsius. In some other embodiments, the RDMO can have a $T_g$ of greater than about 110 degrees Celsius.

In some embodiments, the method can include extruding the TPU modified with the RDMO and curing agent. In some embodiments, the method can include blending the TPU with the RDMO and curing agent simultaneously, such as for example, with a mixer. The blending may be performed through gravimetric addition or other conventional methods. In some embodiments, the blending can be performed at temperatures above 100 degrees Celsius. In some embodiments, the blending can be performed at about 120 degrees Celsius. In some embodiments, the blending can be performed at about 140 degrees Celsius if thermal stability can be maintained to prevent cross-linking, such as for example by compounding the TPU with a thermally stable component. In other embodiments, the method can include extruding the TPU mixed with the RDMO and blended with a peroxide. In some embodiments, the method can include cooling extrudate to, for example, room temperature. In some embodiments, the method can include pelletizing the TPU using conventional TPU pelletizing methods. In some embodiments, the processing temperature is minimized to maintain stability of the peroxide free radical initiator, while allowing for extrusion of the TPU. Lower processing temperatures can be used because some RDMOs are monomeric and therefore have low molecular weights such that they behave like plasticizers within the TPU, which reduces the compound's melt viscosity (increasing its melt flow).

In some embodiments, the curing agent may be a peroxide, the selection of which is based upon peroxide half-life temperatures at the processing temperature. In some embodiments, the peroxide can be 2,5-dimethyl-2,5-di(t-butylperoxy)-3-hexyne, di(t-butyl) peroxide, or 2,5-dimethyl-2,5-di(t-butylperoxy) hexane having 1 hour half-life at 151.8° C., 149.1° C. and 140.3° C., respectively. Other suitable peroxides may include 2,3-Dimethyl-2,3-diphenylbutane, tert-Butyl hydroperoxide, tert-Amyl hydroperoxide, Cumyl hydroperoxide, 1,1,3,3-Tetramethylbutyl hydroperoxide, Isopropylcumyl hydroperoxide, Isopropylcumyl hydroperoxide, 2,5-Dimethyl-2,5-di(tert-butylperoxy) hexyne-3, and 3,6,9-Triethyl-3,6,9-trimethyl-1,4,7-triperoxonane.

In other embodiments, the curing agent may be a photoinitiator, such as for example, 2-Hydroxy-2-methyl-1-phenylpropanone, 1-Hydroxycyclohexyl-phenyl ketone, 1-[4-(2-hydroxyethoxyl)-phenyl]-2-hydroxy-2-methylpropanone, 2-Benzyl-2-(dimethylamino)-4'-morpholinobutyrophenone, 2-Methyl-1-[4-(methylthio)phenyl]-2-morpholinopropan-1-one, 2,4,6-Trimethylbenzoyl-diphenyl phosphine oxide, 2,2-Dimethoxy-2-phenylacetophenone, Ethyl(2,4,6-Trimethylbenzoyl)-phenyl phosphinate-L, and Bis(2,4,6-Trimethylbenzoyl) phenylphosphine oxide. In yet other embodiments, the curing agent may be a compound with a diazenyl functional group (an azo compound).

In one embodiment, the method may include flattening the extrudate, such as by pressing, compression molding, or other suitable processes. In some embodiments, the molding or flattening is performed immediately after the blending. In some embodiments, the flattened or molded extrudate is cooled to, for example, room temperature. In some embodiments, the method can include forming a laminate structure using the flattened extrudate. In some embodiments, the flattened extrudate is a layer between two glass layers (e.g., layers 110 and 120). In other embodiments, the flattened extrudate is a layer between two release liner layers, such as fluorinated ethylene propylene (FEP) release liners. In some embodiments, the two release liners, with the flattened extrudate as an interlayer, are themselves between two glass layers. In some embodiments, the method can include bonding an upper surface of the extrudate to a first glass layer and bonding a lower surface of the extrudate to the second glass layer.

In some embodiments, the method can include curing the laminated structure which is formed with the extrudate. For example, the laminated structure can be sandwiched between release liners and glass cured in a vacuum laminator using standard laminating cycles. In some embodiments, these laminating cycles would include typical cycling procedures known to one skilled in the art. In other embodiments, the method of laminating and curing may occur using autoclaves or vacuum kilns. In one embodiment, the process for laminating and curing using a vacuum bag and autoclave may include the following: conducting a 15 min pull vacuum step on the vacuum-bag-sealed laminate at room temperature and atmospheric pressure, followed by a 30 min temperature ramp-up to 90° C. with pressure at ≥2 Bars, melting for 90 min at 90° C. while maintaining pressure at ≥2 Bars, temperature ramp-up from 90° C. to 150° C. for 60 min, a curing step at 150° C., and a cool-down from 150° C. to ambient temperature while still maintaining pressure at ≥2 Bars until the end of cool-down.

The present description is not to be limited in terms of the particular embodiment described in this application, which are intended as illustrations of various aspects. Many modifications and variations can be made without departing from its spirit and scope, as will be apparent to those skilled in the art.

EXAMPLES

Example 1

Pellets of TPU Elastollan®, an aliphatic polyurethane purchased from BASF (Ludwigshafen, Germany, product number L1275A10), were melted in a C. W. Brabender Instruments, Inc. roller blade mixer (South Hackensack, NJ, USA) with a process temperature of the Brabender® set to 120° C. The melted TPU was mixed at 25 rpm in the Brabender®. The TPU was then combined with small doses of a second component to produce a modified TPU formulation. Table 1 shows a complete list of all formulations (with the corresponding second components) that were produced in these experiments. In addition to the additives in Table 1, each of the formulations also contained 1.5% by weight peroxide.

TABLE 1

| Samples and Compositions | |
|---|---|
| Sample | % By Weight of Second Component |
| Control | BASF L1275A10 (unmodified) |
| LR01936-01 | 20% monofunctional acrylate (commercially available from IGM Resins, Waalwijk, NL: Photomer ® 4810) |
| LR01936-02 | 20% mono functional acrylate (commercially available from IGM Resins: Photomer ® 4808) |
| LR01936-03 | 20% mono functional acrylate (commercially available from IGM Resins: Photomer ® 4812) |
| LR01936-04 | 5% inorganic silsequioxane at the core and organic vinyl groups attached (commercially available from Hybrid Plastics, Hattiesburg, MS, USA: Vinyl POSS OL1170TG) |
| LR01936-05 | 5% inorganic silsequioxane at the core and organic methacrylate groups attached (commercially available from Hybrid Plastics: Methacryl POSS MA0735) |
| LR01936-06 | 5% inorganic silsequioxane with organic isooctyl groups and three active silanol functionalities attached (commercially available from Hybrid Plastics: TriSilanollooctyl POSS) |
| LR01942-01 | 20% difunctional methacrylate (commercially available from Sartomer Arkema, Colombes, France: SR-297) |
| LR01942-02 | 20% difunctional acrylate (commercially available from Rahn USA Corp., Aurura, IL: Genomer 1231) |
| LR01942-03 | 20% trifunctional acrylate pentaerythrityl triacrylate (PETA) (commercially available from Rahn USA Corp.; Miramer M340) |
| LR01942-04 | 20% trifunctional triallyl isocyanurate (TAIC) (commercially available from Sartomer Arkema: SR-533) |

To achieve small lab-scale mixing of the RDMO to the TPU, each dose of additive was allowed to incorporate into the melted TPU before the next dose was added. This was repeated until the target % by weight of the additive was reached according to Table 1. The additive was homogenized with the mixer for a minimum of five minutes.

The rotational speed of the mixer was adjusted to maintain the melt temperature at or below 120° C. for the addition of the peroxide which was added to a 1.5% by weight of the final composition. The peroxide was also homogenized with the mixer. The selection of peroxide was based upon peroxide half-life temperatures versus processing temperatures. For the formulations listed in Table 1, 2,5-dimethyl-2,5-di (t-butylperoxy)-3-hexyne was used as the peroxide agent. (Preferred peroxides include 2,5-dimethyl-2,5-di(t-butylperoxy)-3-hexyne, di(t-butyl) peroxide and 2,5-dimethyl-2,5-di (t-butylperoxy) hexane having a one hour half-life at 151.8° C., 149.1° C. and 140.3° C., respectively. It is understood that other curing agents may be used.

The well-mixed TPU was flattened as much as possible and allowed to cool. It was then wrapped with aluminum foil and placed inside of a polyethylene (PE) bag so that trapped air could be removed at room temperature. The bag was labeled with a permanent marker (Sharpie®) pen and shipped to a laminator for further processing using conventional autoclave lamination methods.

For assembly into 4-inch×4-inch laminates, 5 grams of the modified TPU was pressed between glossy polyethylene terephthalate (PET) and steel plates at 225° F. to yield about 25 mil films. The films were then placed between two fluorinated ethylene propylene (FEP) layers (which are commonly used as release liners and would ensure the removal of the modified TPU after curing). On the free surface of the FEP layer, a glass layer was placed so that the final configuration was the following: Glass/FEP/modified TPU/FEP/Glass.

The laminates were then cured in a vacuum laminator using a 60-minute cycle at 300° F. The cycling steps included ten minutes of evacuation of both top and bottom chambers, then the balance of time pressurizing the top chamber using a partial atmosphere of pressure to a full atmosphere of pressure while maintaining the laminate structure under vacuum in the bottom chamber, resulting in the pressing and curing of the modified TPU within the laminate. Table 2 provides typical starting conditions for vacuum bag and autoclave at 150° C. to laminate and cure Structural TPU-IPN.

TABLE 2

| Processing Conditions | | | | |
|---|---|---|---|---|
| Process | Time Interval | Temperature | Pressure | Cumulative Time |
| Vacuum Bag Laminate | 0 min. | Room Temp. | Atmospheric | 0 min. |
| Pull Vacuum | 15 min. | Room Temp. | Atmospheric | 15 min. |
| Ramp Temperature | 30 min. | Room Temp to 90° C. | Pressurize to ≥ 2 Bars | 45 min. |
| Melt TPU Matrix | 90 min. | 90° C. | ≥2 Bars | 135 min. |
| Ramp Temperature | 60 min. | 90° C. to 150° C. | ≥2 Bars | 195 min. |
| Cure TPU-IPN | 60 min. | 150° C. | ≥2 Bars | 255 min. |
| Cool TPU-IPN | Quench Cool | 150° C. to Ambient | ≥2 Bars | |

The mechanical property of tensile strength (Young's Modulus) was determined for the formulations in Table 1 using a Dynamic Mechanical Analyzer (DMA) under ASTM D4065 standard testing methods. Young's Modulus values are shown for some formulations in Table 3 below. The testing for Young's Modulus at 30° and 60° C. was conducted using Time Temperature Superposition (TTS) to determine load duration test results. Load duration tests were performed at 30° C. for 1 sec, 3 sec, 1 min, 1 hour, 1 day, 1 month, and 10 years for all formulations for which these tests were possible. BASF L1275A10 (unmodified) TPU served as a control.

The results for the 30° C. test are outlined in Table 3. BASF L1275A10 (unmodified) TPU exhibited a Young's Modulus of 10.02 MPa, 8.69 MPa, 6.39 MPa, and 3.83 MPa for 1 sec, 3 sec, 1 min, and 1 month, respectively. Compared to the control TPU, higher Young's Modulus values were observed for the following formulations: LR01936-05 (5% inorganic silsequioxane at the core and organic methacrylate groups attached with 1.5% peroxide), LR01942-02 (20% difunctional acrylate with 1.5% peroxide), LR01942-03 (20% trifunctional acrylate PETA with 1.5% peroxide), and LR01942-04 (20% trifunctional TAIC with 1.5% peroxide). For example, in the 1 sec test, the results for these four formulations were 18.34 MPa, 23.89 MPa, 25.04 MPa, and 18.45 MPa, respectively. LR01942-03, comprising the 20% trifunctional acrylate PETA-modified TPU, notably outperformed BASF L1275A10 unmodified TPU with 6.58 MPa in the 1 month 30° C. load duration test, a 1.7-fold higher Young's Modulus compared to the control.

TABLE 3

Young's Modulus Testing at 30° C.

| Sample | 30° C. Load Duration (Young's Modulus MPa) | | | | | | |
|---|---|---|---|---|---|---|---|
| | 1 sec | 3 sec | 1 min | 1 hour | 1 day | 1 month | 10 yrs. |
| BASF L1275A10 unmodified TPU | 10.02 | 8.69 | 6.39 | 5.01 | 4.38 | 3.83 | 3 |
| LR01936-01 | 3.33 | 2.69 | 1.53 | 0.73 | 0.38 | NT* | NT |
| LR01936-02 | Too Soft | NT | NT | NT | NT | NT | NT |
| LR01936-03 | Too Soft | NT | NT | NT | NT | NT | NT |
| LR01936-04 | 3.22 | 3.07 | 2.78 | 2.4 | 2.17 | 1.97 | NT |
| LR01936-05 | 18.34 | 14.59 | 9.09 | 5.37 | 4.09 | 3 | NT |
| LR01942-02 | 23.89 | 19.21 | 10.15 | 5.39 | 3.96 | 3.14 | 2.67 |
| LR01942-03 | 25.04 | 23.14 | 16.87 | 9.76 | 8.44 | 6.58 | 5.23 |
| LR01942-04 | 18.45 | 16.14 | 10.16 | 5.76 | 4.55 | 3.66 | 3.02 |

*NT means Not Tested

Example 2

The formulations were also compared against the BASF L1275A10 unmodified TPU base-polymer control in a 60° C. Young's Modulus test conducted for the durations shown in Table 4. ASTM D4065 standard testing methods were also used for these tests. At the higher temperature, BASF L1275A10 unmodified TPU exhibited 3.51 MPa at 3 sec and 2.39 MPa at 1 hour. LR01942-03 outperformed the control in this test as well, exhibiting 3.62 MPa at 3 s and 2.86 MPa at 1 hour. The results for all the compositions included in this analysis are shown in Table 3. Notably, LR01942-04, the formulation comprising 20% trifunctional TAIC, resulted in the same Young's Modulus value at 1 hour as the control with 2.39 MPa.

TABLE 4

Young's Modulus Testing at 60° C.

| Sample | 60° C. Load Duration (Young's Modulus MPa) | | | |
|---|---|---|---|---|
| | 1 sec | 3 sec | 1 min | 1 hour |
| BASF L1275A10 unmodified TPU | 3.69 | 3.51 | 2.95 | 2.39 |
| LR01942-02 | 2.12 | 2.05 | 1.75 | 1.44 |
| LR01942-03 | 3.79 | 3.62 | 3.22 | 2.86 |
| LR01942-04 | 3.04 | 2.94 | 2.65 | 2.39 |

Due to the effects of crosslinking with the peroxide, which can occur at higher temperatures, an increase of mixing temperature in the Brabender to over 120° C. was found to negatively impact the method of making all of the formulations except those which included POSS. For the POSS-modified TPU, lower susceptibility to cross-linking was observed at higher mixing temperatures such as 140° C.

At this point a pre-structural TPU interlayer is fully formulated with RDMO and free radical peroxide curing agent that remains unreacted (non-crosslinked). The interlayer's appearance/aesthetics are identical to conventional TPU interlayer. The pre-structural interlayer is packaged as normal and shipped to the glass laminator's for conventional autoclave lamination processing.

The glass lamination and curing of the structural TPU is accomplished simultaneously by standard lamination methods. The lamination process is initiated by sandwiching the pre-structural interlayer between 2 glass lenses, then the composite laminate is vacuum bagged to remove entrapped air, following by processing by conventional autoclave lamination methods to produce safety glass laminates. The first step consists of an initial deaeration of the structural TPU at room temperature via the vacuum bag. Next the bagged laminate structure is transferred to the autoclave where it is over pressurized to greater than 1 atmosphere at room temperature to eliminate air entrapment and prevent void formation during the thermal process. Then the laminate is heated using a designed temperature profile that transitions the interlayer from room temperature through a controlled melting stage, then ultimately plateaus at a targeted cure temperature. Once at cure temperature, the laminate's core temperature is maintained for an appropriate amount to initiate the internal peroxide free radical curing agent to crosslink (cure) the RDMO component of the TPU interlayer. Once cured the laminate is cooled in a manner consistent with cooling rates that minimize haze formation. The final cured laminate structure is comprised of a crosslinked structural TPU (TPU/Semi-IPN) interlayer with enhanced structural properties versus standard TPU interlayers.

While the compositions, laminates and methods discussed herein have been described in detail herein in accordance with certain preferred embodiments thereof, many modifications and changes therein may be effected by those skilled in the art. Accordingly, the foregoing description should not be construed to be limited thereby but should be construed to include such aforementioned obvious variations and be limited only by the spirit and scope of the following claims.

What is claimed is:

1. A composition comprising:

a thermoplastic polyurethane (TPU);

a second component cross-linked with the TPU and present in an amount of about 3% by weight to about 20% by weight of the composition, wherein the second component is selected from the group consisting of difunctional acrylate, trifunctional acrylate and tri-allyl isocyanurate; and wherein the composition is configured to have a Young's Modulus of greater than about 10.0 megapascals (MPa) for a load duration of one second at 30° C.

2. The composition of claim 1, a thermal curing agent that cross-links the second component with the TPU.

3. The composition of claim 2, wherein the thermal curing agent is selected from a group consisting of UV-activated photoinitiators, peroxides, and azo compounds.

4. The composition of claim 2, wherein the thermal curing agent is a peroxide.

5. The composition of claim 1, wherein the second component is cross-linked to form a semi-interpenetrating polymer network.

6. The composition of claim 1, wherein the second component and the TPU are cross-linked to form an interpenetrating polymer network.

7. The composition of claim 1, wherein the second component is about 20% by weight of the composition.

8. The composition of claim 1, wherein the second component is pentaerythrityl triacrylate.

9. A composition comprising:

a thermoplastic polyurethane (TPU);

a second component in an amount of about 3% by weight to about 20% by weight of the composition, wherein the second component is selected from the group consisting of a monofunctional acrylate, difunctional acrylate, trifunctional acrylate, monofunctional methacrylate, difunctional methacrylate, trifunctional methacrylate, an acrylate or methacrylate having four to six functional groups, pentaerythrityl triacrylate, polyhedral oligomeric silsequioxane, and tri-allyl isocyanurate;

a thermal curing agent that cross-links the second component with the TPU, wherein the thermal curing agent comprises peroxide; and wherein the composition is configured to have a Young's Modulus of greater than about 10.0 megapascals (MPa) for a load duration of one second at 30° C.

10. The composition of claim 9, wherein the second component is cross-linked to form a semi-interpenetrating polymer network.

11. The composition of claim 9, wherein the second component and the TPU are cross-linked to form an interpenetrating polymer network.

12. The composition of claim 9, wherein the second component is about 20% by weight of the composition.

13. The composition of claim 9, wherein the second component is about 5% by weight of the composition.

14. The composition of claim 9, wherein the second component is pentaerythrityl triacrylate (PETA).

15. The composition of claim 9, wherein the second component comprises a polyhedral oligomeric silsequioxane.

16. The composition of claim 9, wherein the second component is silsequioxane.

17. A laminate structure comprising:

a first layer;

a second layer comprising thermoplastic polyurethane (TPU), a second component cross-linked with the TPU and present in an amount of about 3% by weight to about 20% by weight of the second layer, the second component being selected from the group consisting of difunctional acrylate, trifunctional acrylate and tri-allyl isocyanurate; and wherein the second layer is configured to have a Young's Modulus of greater than about 10.0 megapascals (MPa) for a load duration of one second at 30° C.

18. The laminate structure of claim 17, further comprising a thermal curing agent that cross-links the second component with the TPU.

19. The laminate structure of claim 17, further comprising a third layer, wherein the second layer is disposed between the first and third layers.

20. The laminate structure of claim 19, wherein the first and third layers comprise glass layers.

21. The laminate structure of claim 20, wherein the second layer forms an interlayer between the glass layers, and further comprising a release liner separating the interlayer and the glass layers.

22. The laminate structure of claim 17, wherein the second component is cross-linked to form a semi-interpenetrating polymer network.

23. The laminate structure of claim 17, wherein the second component and the TPU are cross-linked to form an interpenetrating polymer network.

24. The laminate structure of claim 17, wherein the second component is about 20% by weight of the second layer.

25. The laminate structure of claim 17, wherein the second component is about 5% by weight of the second layer.

26. The laminate structure of claim 17, wherein the second component is pentaerythrityl triacrylate.

27. A window comprising the laminate structure of claim 17.

28. A roofing structure comprising the laminate structure of claim 17.

* * * * *